US007780386B2

(12) United States Patent
Lau et al.

(10) Patent No.: US 7,780,386 B2

(45) Date of Patent: Aug. 24, 2010

(54) TORQUE-LIMITED ELECTRICAL CONNECTOR

(75) Inventors: Michael Robert Lau, San Ramon, CA (US); Eric Michel De Wild, San Mateo, CA (US)

(73) Assignee: Cobham Defense Electronic Systems Corporation

( * ) Notice: Subject to any disclaimer, the term of this patent is extended or adjusted under 35 U.S.C. 154(b) by 1672 days.

(21) Appl. No.: 10/925,441

(22) Filed: Aug. 25, 2004

(65) Prior Publication Data

US 2006/0043809 A1 Mar. 2, 2006

(51) Int. Cl.
*F16B 31/00* (2006.01)

(52) U.S. Cl. ........................................ 411/7; 439/474

(58) Field of Classification Search .................... 411/6, 411/7, 216; 439/312, 320, 474

See application file for complete search history.

(56) References Cited

U.S. PATENT DOCUMENTS 4,046,052 A * 9/1977 Nordstrom .................... 411/1
4,609,314 A * 9/1986 Metz ............................ 411/7
5,041,004 A * 8/1991 Waldorf ...................... 439/306
5,399,096 A * 3/1995 Quillet et al. ............... 439/321
6,082,941 A * 7/2000 Dupont et al. ................ 411/7
6,802,680 B1 * 10/2004 Rubenstein .................... 411/7

* cited by examiner

*Primary Examiner*—Gary Estremsky
(74) *Attorney, Agent, or Firm*—Jaeckle, Fleischmann & Mugel, LLP

(57) ABSTRACT

A coupling mechanism is provided. The coupling mechanism includes a bushing assembly adapted to establish a coupling when rotated, a housing that is rotatable when torque is applied to the housing, a torque-limit member positioned between the housing and the bushing assembly such that when the torque-limit member is in a positive-lock state, the housing and bushing assembly rotate jointly upon the application of torque until a predefined torque level is attained. A compressible member is included that engages the torque-limit member to define through frictional resistance of moving parts and parts geometry a predefined torque level. The torque-limit member switches from the positive-lock state to a ratchet state when the predefined torque level is attained. When the torque-limit member is in the ratchet state, the housing rotates relative to the bushing assembly.

19 Claims, 6 Drawing Sheets

Slip-Ring
Cross-Section View

Slip-Ring
Outside View

TORQUE-LIMITED ELECTRICAL CONNECTOR

BACKGROUND OF THE INVENTION

This invention relates generally to electrical connectors and more particularly, to electrical connectors having a threaded coupling.

A variety of electrical connectors have been proposed to interconnect electrical cables with equipment in a simple and reliable fashion. In certain applications, the connectors are exposed to very adverse operating conditions, such as wide ranging temperatures, intemperate weather, vibration and the like. For example, the electronic equipment in an aircraft is connected to numerous electrical cables. It is very important that the electrical connectors remain securely coupled to the equipment and not become accidentally unplugged or damaged over their specified life expectancy and environment.

Some electrical cable connectors include threaded bushings that are coupled to a threaded male receptacle on the electronic equipment. The bushings are free spinning to allow the cable connector to turn, when being mated to its male receptacle, without the attached electrical cable turning as well. A free spinning bushing allows the connector to be tightened without twisting the electrical cable to which the connector is attached. Depending on the purpose and application for the electrical cables and connectors (e.g. aerospace defense), some electrical connectors may require tightening by a specified amount defined by a torque. The torque applied should not exceed the required torque value so much as to cause damage and strip the connector threads. The typical conventional method for tightening an electrical connector employs a torque wrench connected to a gauge or meter that can be viewed by the user while tightening the connector. However, even with a torque wrench, the user may over torque the connector. Thus, the method lacks assurance that the connector is tightened to the required torque without over tightening.

A need exists for a free spinning electrical connector with torque-limiting capability.

BRIEF DESCRIPTION OF THE INVENTION

A coupling mechanism is provided. The coupling mechanism includes a bushing assembly adapted to establish a coupling when rotated, a housing that is rotatable when torque is applied to the housing, a torque-limit member positioned between the housing and the bushing assembly such that when the torque-limit member is in a positive-lock state, the housing and bushing assembly rotate jointly upon the application of torque until a predefined torque level is attained. A compressible member is included that engages the torque-limit member to define through frictional resistance of moving parts and parts geometry a predefined torque level. The torque-limit member switches from the positive-lock state to a ratchet state when the predefined torque level is attained. When the torque-limit member is in the ratchet state, the housing rotates relative to the bushing assembly.

In an alternate embodiment, a coupling mechanism is provided with a main shaft configured to receive an electrical conductor. The main shaft is rotatably mounted to a body adapted to establish a coupling when rotated and a housing. A torque-limit member interconnects the housing and the body when it is in a positive-lock state. The housing is locked to the body when the torque-limit member is in a positive-lock state until a predefined torque level is attained. When the predefined torque level is attained, the torque-limit member enters a ratchet state and the housing is unlocked from the body such that the housing is able to rotate relative to the body. Also rotatably mounted on the main shaft is a bearing assembly that engages the torque-limit member.

DETAILED DESCRIPTION OF THE INVENTION

Figure 1:
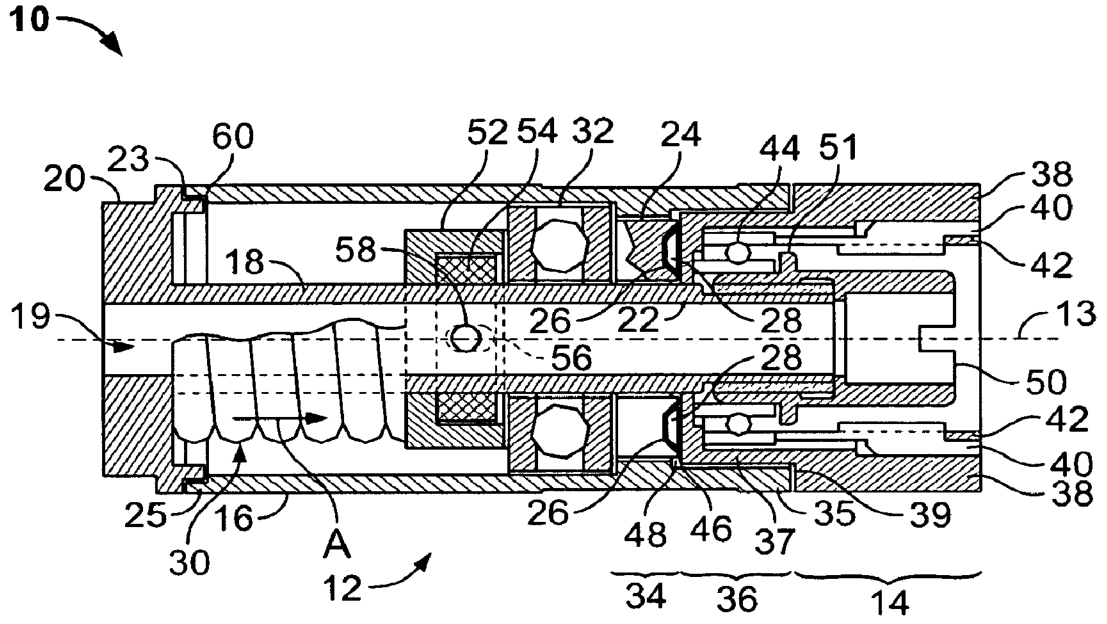
FIG. 1 is a section view of a free spinning torque-limiting electrical connector formed in accordance with an embodiment of the present invention.

FIG. 1 illustrates a side section view of an electrical connector 10. Electrical connector 10 provides a coupling mechanism for connecting an electrical cable to electronic equipment. The electrical connector 10 includes two main assemblies, a housing 12 and a bushing assembly 14. The bushing assembly 14 is an example of a body adapted to establish a coupling to mating electrical equipment when rotated. The housing 12 is rotatably joined to the bushing assembly 14. The housing 12 is rotatable by the application of torque, such as to an intermediate section 34 of a sleeve 16 by a user's hand or tool. A torque-limit member, such as a ratchet plate 24 and protrusions 28, rotatably interconnects the housing 12 and the bushing assembly 14 when the ratchet plate 24 is in a positive-lock state.

When the ratchet plate 24 is in a positive-lock state, the housing 12 and the bushing assembly 14 turn together (or jointly) about a rotation axis 13 when torque is applied to the intermediate section 34. As the bushing assembly 14 is tightened onto its mating male connector, the torque needed to turn the bushing assembly 14 increases. The ratchet plate 24 remains in the positive-lock state until a predefined torque level or threshold is obtained. A compressible member, such as a spring 30, engages the ratchet plate 24 to the protrusions 28 to predefine a torque level or value at which time the ratchet plate 24 switches from a positive-lock state to a ratcheting state.

When the torque applied to the housing 12 reaches the predefined torque level, the housing 12 is unlocked from the bushing assembly 14 whereby the housing 12 is allowed to rotate relative to the bushing assembly 14. When the ratchet plate 24 is in a positive-lock state, the housing 12 and bushing assembly 14 turn together, and when the ratchet plate 24 is in the ratchet state, the housing 12 turns separately from and relative to the bushing assembly 14.

A bearing 32 is provided within the sleeve 16 and prevents rotation of the spring 30 and a compression bushing 52 when the ratchet plate 24 is in the ratchet state. Bearing 32 also provides a smoother rotation to the sleeve 16. The sleeve 16 forms an outer covering with a hexagon-shaped contour that is configured to be gripped by the user or a tool. The user/tool apply a torque about the sleeve 16 to rotate the sleeve 16 about the axis 13. The sleeve 16 has an inner intermediate section 34 which rigidly retains the ratchet plate 24 and a lead section 36 which receives a rear portion of the bushing assembly 14.

The inner intermediate section 34 has a hexagon-shaped interior contour that matches and securely engages a hexagon-shaped exterior contour of the ratchet plate 24. The interlocking contours cause the ratchet plate 24 to rotate at all times with the sleeve 16 regardless of the state. The lead section 36 has a smooth, circular interior contour that receives a rear section 37 of the bushing assembly 14. The rear section 37, located on an outer bushing 38, has a smooth circular exterior contour and rotates within and with respect to the lead section 36 of the sleeve 16 when in a ratchet state. The sleeve 16 has a lead edge 35 and tail edge 60, which allows minimal displacement of the sleeve 16 during either the positive lock state, or the ratchet state. A bearing 44 resides within the bushing assembly 14. The bushing assembly 14 includes the outer bushing 38 attached (e.g. press fit or other means) to an inner bushing 40. The inner bushing 40 has grooves/threads 42 which screw to a threaded male receptacle when the bushing assembly 14 is rotated in the clockwise direction. A shaft 18 has a rear end formed integrally with a shaft base 20. The shaft base 20 is configured to be secured to an end of an electrical cable. The shaft base 20 has a flange 23 that supports a rear end 25 of the sleeve 16. The shaft 18 has a hollow core 19 configured to receive an electrical center conductor and insulator. A mating end 22 (located integral to the shaft 18) is threaded and receives an interface nut 50. The nut 50 includes a rib 51 extending about the outer perimeter of the nut 50. The rib 51 on the nut 50 retains the bearing 44 in the bushing assembly 14.

The bearing 44 supports the bushing assembly 14 and the bearing 32 supports the sleeve 16 with respect to the shaft 18. The sleeve 16 and the bushing assembly 14 rotate about the shaft 18 (and/or the axis 13) via the bearing 32 and the bearing 44.

The ratchet plate 24 includes a slip surface 48 having a series of holes or dimples generally designated as recesses 26 arranged in a circular pattern about the rotation axis 13. The bushing assembly 14 has an outer faced wall 46 with nipples or projections generally designated as the protrusions 28 arranged in a circular pattern about the rotation axis 13. The protrusions 28 are spaced and configured to fit into the recesses 26.

Optionally, the recesses 26 and the protrusions 28 may be reversed such that the recesses 26 are on the wall 46 and the protrusions 28 are on the slip surface 48. The spring 30 applies an axial force in the direction of arrow A which in turn, applies a pressure to the ratchet plate 24 at minimal, during the ratchet state. This pressure translates to frictional forces between the protrusions 28 and the recesses 26 whenever the ratchet plate 24 rotates about the axis 13. The recesses 26 in the slip surface 48 of the ratchet plate 24 are held against the protrusions 28 by the force of the spring 30. The friction force that exists between the recesses 26 and the protrusions 28, as well as the size and geometry of the recesses 26 and the protrusions 28, maintains the ratchet plate 24 in a positive-lock state with the bushing assembly 14 until a predefined torque value is applied to the sleeve 16 and about the axis 13. So long as the ratchet plate 24 is in the positive-lock state, the bushing assembly 14 rotates jointly with the sleeve 16 about the shaft 18 and the axis 13.

The recesses 26 and the protrusions 28 remain securely engaged with one another until a predefined torque level is reached. The predefined torque level is established by the axial force applied by the spring 30, frictional forces between moving mechanisms (e.g. bearing assemblies, etc.) and the protrusion and recess geometries. Once the predefined torque level is exceeded, the protrusions 28 and the recesses 26 disengage from one another and the slip surface 48 rotates (slips across) relative to the wall 46 of the bushing assembly 14.

As the bushing assembly 14 is coupled (e.g., screwed) onto a threaded male connector, via the threads 42, the interface therebetween tightens and it becomes increasingly harder to turn the bushing assembly 14. The bushing assembly 14 experiences a coupling resistance that increases as the coupling is tightened. The coupling resistance increases until reaching the predefined torque level, at which the ratchet plate 24 enters the ratchet state and the protrusions 28 and the recesses 26 disengage or unlock from one another.

The compression bushing 52 and a retaining ring 54 are provided upon the shaft 18. The compression bushing 52 and the retaining ring 54 pre-load the spring 30 with a specified pressure, while at the same time, significantly reducing the pressure/pre-load placed on the bearing 32 and the ratchet plate 24. The compression bushing 52 forces the spring 30 to compress to a specified distance creating a specific pressure. The distance is held accurately by means of the retaining ring 54 (or other means). A portion 58 of the retaining ring 54 rests within oval slot 56 on the shaft 18 and the remainder provides a hard stop for the compression bushing 52. The purpose of the retaining ring 54 is two-fold. The location of the retaining ring 54 regulates the pressure of the spring 30 while creating an air-gap between the compression bushing 52 and the bearing 32 to minimize the pre-load on the bearing 32 and the ratchet plate 24 during the positive lock state.

As stated the air gap relieves or minimizes the bearing 32 of any pressure induced by the spring 30 when the ratchet plate 24 is in the positive-lock state. When the ratchet plate 24 experiences increased coupling resistance, the air gap is eliminated as the protrusions 28 begin to disengage (slip) from the recesses 26 of the ratchet plate 24, thus causing the ratchet plate 24 to displace in a direction opposite of the arrow A and push against the bearing 32. The bearing 32 then begins to push against the compression bushing 52. The slippage between the protrusions 28 and the recesses 26 occurs when the threshold torque level is reached, thus allowing ratcheting of the ratchet plate 24 to occur.

In one embodiment, the retaining ring 54 is removed and the compression bushing 52 is configured without the retaining ring 54. In yet another embodiment, the protrusions 28 may be ramped, teeth-like, spiral and the like.

Figure 2:
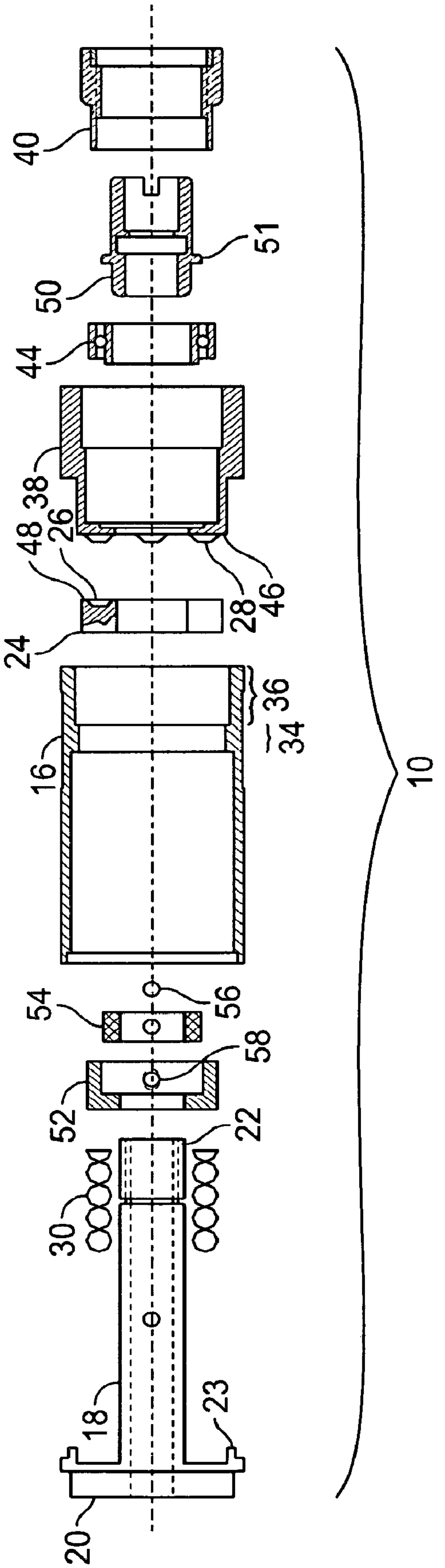
FIG. 2 is an exploded side view of the components of the connector of FIG. 1.

FIG. 2 shows an exploded view of the electrical connector 10 of FIG. 1. During assembly the shaft 18 receives the spring 30. The compression bushing 52 and the retaining ring 54 are slid onto the shaft 18. The compression bushing 52 presses against the spring 30. The oval slot 56 allows the compression bushing 52 to shift right or left along the shaft 18 by a limited range of motion. The bearing 32, not shown in FIG. 2, is next loaded onto the shaft 18 to the right of the compression bushing 52.

The sleeve 16 slides over the spring 30 and the compression bushing 52 and is constrained by the flange 23 formed in the shaft base 20. The retaining ring 54 holds the spring 30 in compression and the compression bushing 52 in the desired locations. The ratchet plate 24 then slides into the intermediate section 34 of the sleeve 16. Separately from the housing 12, the bearing 44, the interface nut 50, and the inner bushing 40 are then inserted into the outer bushing 38 and bearing 44 is held in place by the rib 51 on the interface nut 50. Alternatively, the bearing 44 may be built into the outer bushing 38. The inner bushing 40 is secured (e.g. press fitted or other means) to the inside of the outer bushing 38 and has the threads 42 on the inner surface for coupling to a connector with a mating male receptacle. The bushing assembly 14 then slides into the sleeve 16 against the ratchet plate 24. The interface nut 50 screws onto the threaded mating end 22 of the shaft 18 and holds the components together. The inside of the shaft 18 is hollow, permitting the electrical center conductor and insulator to pass through. The center conductor and insulator (not shown) extend to the interface nut 50.

Figure 3:
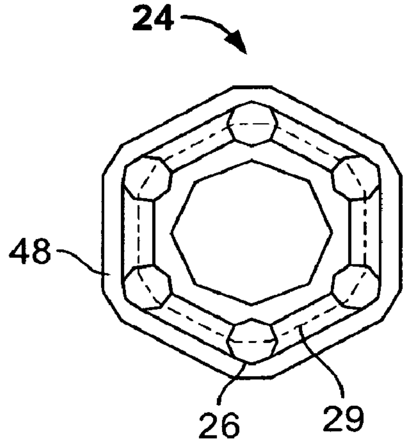
FIG. 3 is a front view of a ratchet plate utilized within the connector of FIG. 1.

FIG. 3 illustrates a front view of the ratchet plate 24 utilized within the connector 10 of FIG. 1 with the concave recesses 26. The recess 26 is spherical in shape. Alternatively, the recess 26 may be of some other shape, e.g. hexagon, ramped, stepped, or saw tooth. The recesses 26 are arranged in a circular configuration 29 on the slip surface 48 of the ratchet plate 24.

Figure 4:
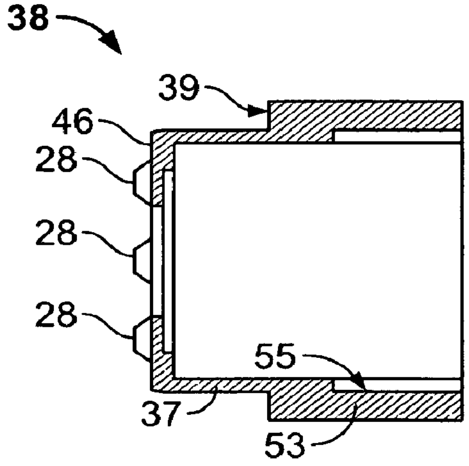
FIG. 4 is a side section view of a bushing utilized within the connector of FIG. 1.

FIG. 4 illustrates a side section view of the outer bushing 38 utilized within the connector 10 of FIG. 1. The protrusions 28 on the wall 46 are spherical in shape to match the shape of the recesses 26. Alternatively, the protrusions 28 may be of some other shape, e.g. hexagon, ramped, stepped, or saw tooth. The outer perimeter of the outer bushing 38 has a shoulder 39. The shoulder 39 constrains the sleeve 16 on one end when electrical connector 10 is fully assembled. The inner perimeter of the outer bushing 38 also has a counterbore 55 to receive the inner bushing 40 which is secured to the outer bushing 38.

Figure 5:
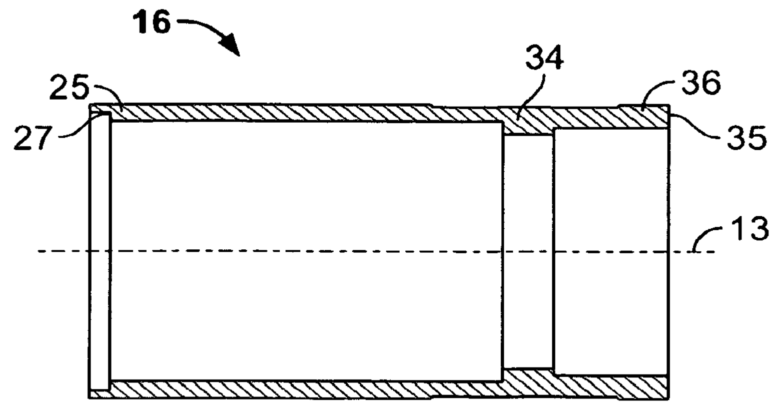
FIG. 5 is a side section view of a sleeve utilized within the connector of FIG. 1.

FIG. 5 is a side section view of the sleeve 16 utilized within the connector 10 of FIG. 1. The sleeve 16, in one embodiment, is a thin cylindrical-like container with a hollow interior configured to receive the internal components of the connector housing 12 and to interface with the bushing assembly 14. The rear end 25 of the sleeve 16 includes a counterbore 27 that slides over and near the flange 23 of the shaft base 20 (the shaft 18 not shown in FIG. 5). The shaft base 20 supports the rear end 25 of the sleeve 16 about the shaft 18 (shown in FIG. 1) with the axis of the shaft 18 being the rotation axis 13. Fitted over the shaft 18 within the sleeve 16, as described in connection with FIG. 2, is the spring 30, the compression bushing 52, the retaining ring 54, and the bearing 32. The bearing 32 is positioned adjacent or slightly behind the intermediate section 34 of the sleeve 16, and provides rotation support for the sleeve 16 about the shaft 18. The outside of the intermediate section 34 provides a hexagon-shaped contour that is configured to be gripped by the user or a tool (e.g., a wrench). However, it should be noted that any shape may be provided. For example, a hexagon-shaped interior contour of the intermediate section 34 is complementary to, and securely engages a hexagon-shaped exterior contour of the ratchet plate 24 such that when the sleeve 16 is rotated, the ratchet plate 24 also rotates. The lead section 36 of the sleeve 16 has a smooth, circular interior contour that receives the rear section 37 of the bushing assembly 14. The lead edge 35 of the sleeve 16 is constrained by the shoulder 39 formed in the exterior of the bushing assembly 14.

In operation, when the ratchet plate 24 is in the positive-lock state without the threshold torque level yet attained, and torque is applied to cause the sleeve 16 to rotate, the sleeve 16 rotates causing rotation of various components within the housing 12 and the bushing assembly 14. Once the threshold torque level is attained, the ratchet plate 24 changes from the positive-lock state to the ratchet state. When in the ratchet state, applying torque to cause the sleeve 16 to rotate causes rotation (ratcheting) of the housing 12 relative to the bushing assembly 14 (which will no longer rotate). The pre-defined torque which causes ratcheting is then transferred to the threads 42 of the inner bushing 40 to couple the electrical connector 10 to its mating male receptacle with the proper torque value.

Figure 6:
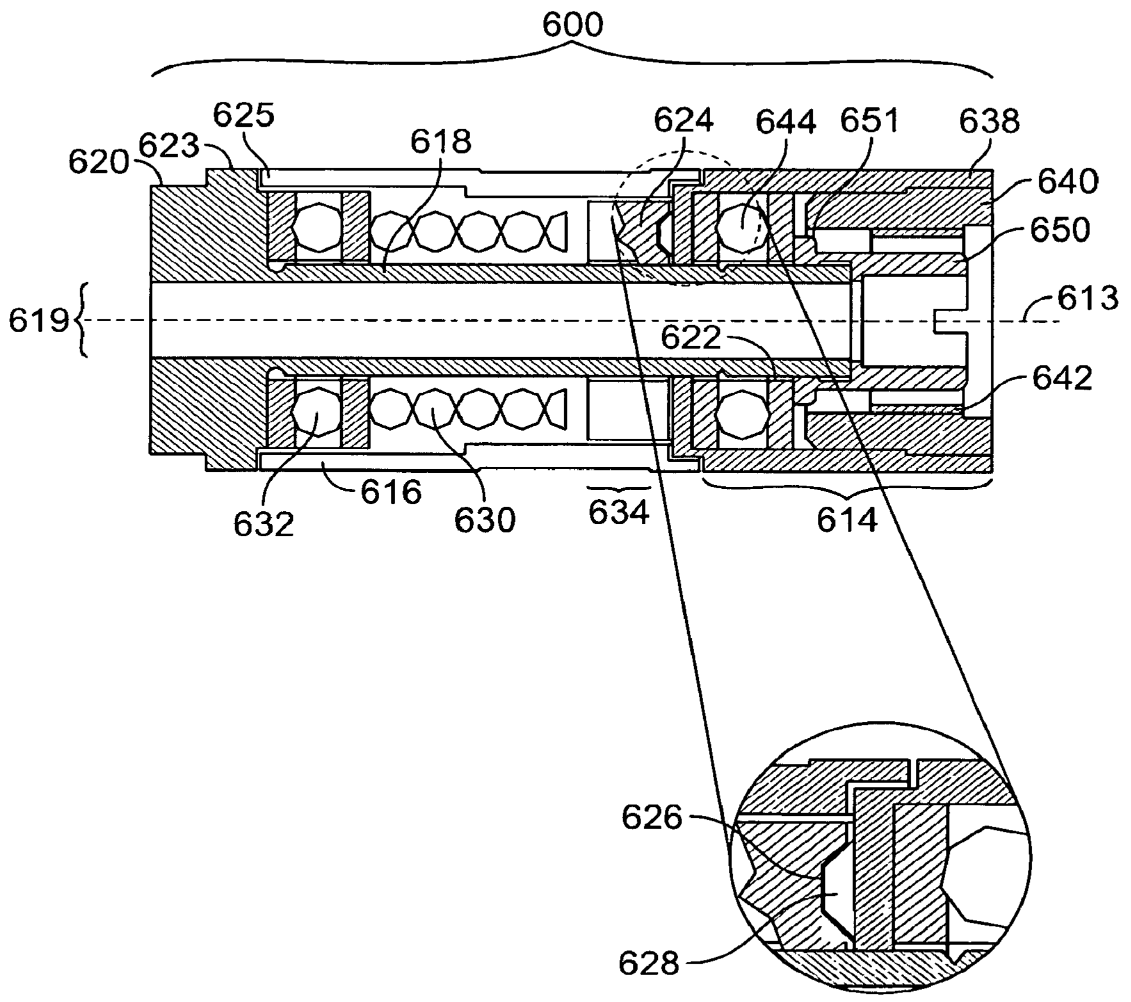
FIG. 6 is a section view of a free spinning torque-limiting electrical connector formed in accordance with an alternative embodiment of the present invention.

FIG. 6 illustrates a side section view of an alternative embodiment of a free spinning torque-limiting electrical connector 600. The electrical connector 600 shown in FIG. 6 is very similar to the electrical connector 10 shown in FIG. 1. The main difference in the design of the two electrical connectors 10 and 600 is that the electrical connector 600 has a bearing 632 residing to the left of a spring 630 as opposed to the bearing 32 residing to the right of the spring 30 for the electrical connector 10. FIG. 6 has no compression bushing 52 with the oval slot 56 as in the electrical connector 10 of FIG. 1.

The spring 630 pushes against the bearing 632 at all times (e.g. even when no torque is being applied to rotate the connector 600). Thus the bearings of bearing 632 have more potential for wear in the configuration of FIG. 6 as compared to the bearings of bearing 32 of FIG. 1 due to pressure always being exerted on the bearing 632 by spring 630. However, with a proper selection of the bearing type for the bearing 632, e.g. a thrust bearing, the bearing 632 free spins almost frictionless when under a load. Although the connector 10 of FIG. 1 may offer a more optimal design with regard to the wear of the bearings and frictionless free spin, the connector 600 of FIG. 6 may be easier to mass produce with better adherence to needed tolerances.

The rest of the components shown in FIG. 6 for the electrical connector 600 are similar to the components shown in FIG. 1 for the electrical connector 10. The bushing assembly 614 includes an outer bushing 638 attached (e.g. press fit or other means) to an inner bushing 640. The inner bushing 640 has grooves/threads 642 which screw to a threaded male receptacle when the bushing assembly 614 is rotated in the clockwise direction. The shaft 618 has a rear end formed integrally with a shaft base 620. The shaft base 620 is configured to be secured to an end of an electrical cable. The shaft base 620 has a flange 623 that supports a rear end 625 of the sleeve 616. The shaft 618 has a hollow core 619 configured to receive an electrical center conductor and insulator. A mating end 622 (located integral to the shaft 618) is threaded and receives an interface nut 650. The nut 650 includes a rib 651 extending about the outer perimeter of the nut 650. The rib 651 on the nut 650 retains the bearing 644 in the bushing assembly 614.

The functioning or operation of the electrical connector 600 is similar to that of electrical connector 10. When an installer applies torque to an intermediate section 634 of the sleeve 616, the ratchet plate 624 turns and engages with the bushing assembly 614 and both rotate about the shaft 618 and/or the axis 613. This causes tightening of the bushing assembly 614 to a mating connector. Once tightened to a threshold torque level or limit, the recesses 626 begin slipping and disengages from the protrusions 628 and as such, the ratchet plate 624 begins to ratchet. In the ratcheting state, the ratchet plate 624 and the sleeve 616 rotate around the shaft 618, but the bushing assembly 614 does not rotate.

Figure 7:
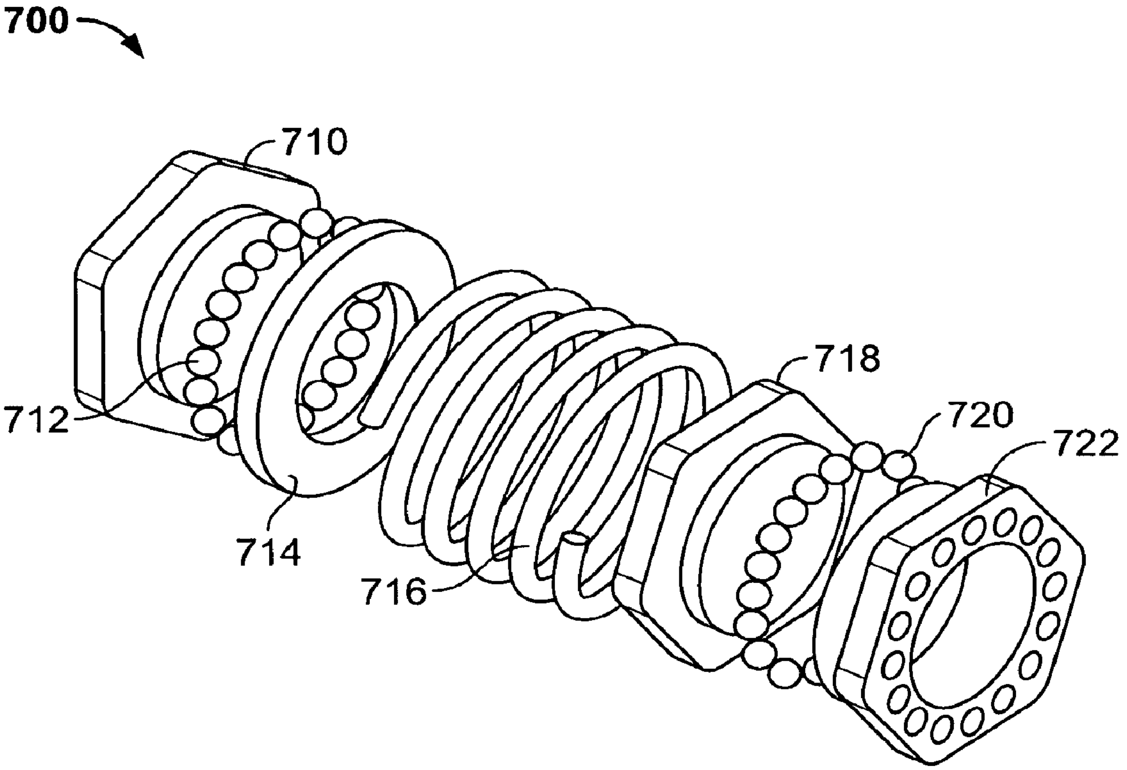
FIG. 7 is an exploded view of components internal to the housing of an electrical connector formed in accordance with an embodiment of the present invention.

FIG. 7 illustrates components 700 internal to the housing of an electrical connector formed in accordance with an embodiment of the present invention. One end of a spring 716 engages a side of a bearing/pressure plate 718, with the other side of the bearing/pressure plate 718 in combination with a ratchet plate 722 enclosing a bearing 720. The other end of the spring 716 engages a side of a bearing casing 714, with the other side of the bearing casing 714 in combination with a bearing/pressure plate 710 enclosing a bearing 712. The bearings 712 and 720 allow the spring 716 to rotate smoothly about a shaft (shaft not shown in FIG. 7).

Figure 8:
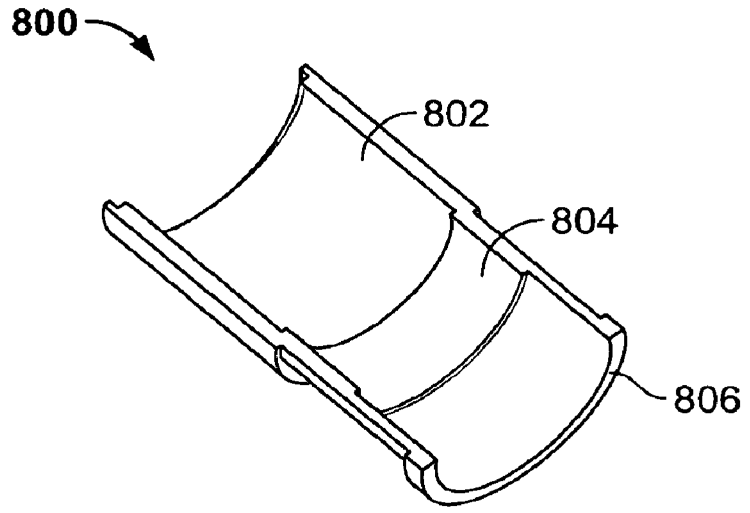
FIG. 8 is a partial cross-sectional view of a slip ring component formed in accordance with an embodiment of the present invention.
Figure 9:
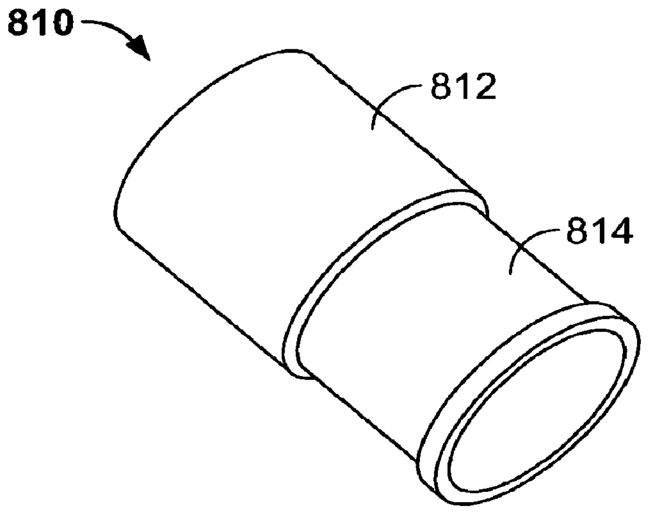
FIG. 9 is an isometric view of a slip ring component formed in accordance with an embodiment of the present invention.

FIGS. 8 and 9 illustrate a slip ring 810 formed in accordance with an embodiment of the present invention. The slip ring 810 is a sleeve, e.g. the sleeve 625 of FIG. 6, and is configured having a smooth round interior portion 802 and an interior hexagon-shaped portion 804. When the electrical connector is in the positive-lock state, a front edge 806 of the slip ring 800 rests against the shoulder 39 in outer bushing 38 (shown in FIG. 1). The smooth round interior portion 802 includes a corresponding smooth round exterior portion 812 and the inner hexagon-shaped portion 804 includes a corresponding hexagon-shaped outer portion 814. A wrench may be fitted to the hexagon-shaped outer portion 814 to apply torque to the electrical connector as described herein.

Figure 10:
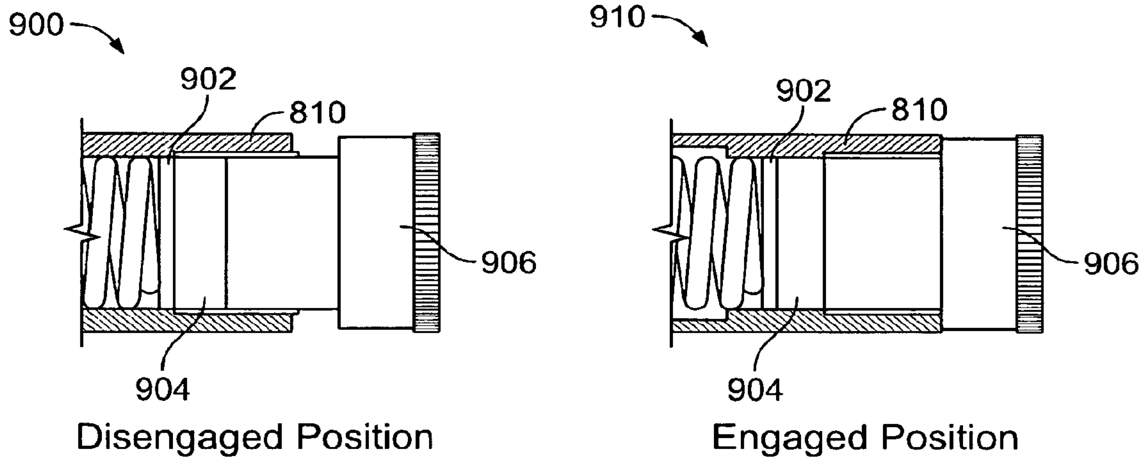
FIG. 10 illustrates two operational positions of the slip ring of FIGS. 8 and 9.

FIG. 10 illustrates the operation of the slip ring 810 of FIGS. 8 and 9 in accordance with an embodiment of the present invention. In operation, the slip ring 810 has two positions, an engaged position 910 (positive-lock state or ratcheting state for the connector) and a disengaged position 900 (free spinning state for the connector). When the slip ring 810 is manually pulled back into the disengaged position 900, a bearing pressure plate 902 is forced to smoothly rotate with any rotation of the slip ring 810. During this state, only bearing mechanisms are active and the user may hand tighten the connector by turning an outer bushing 906 clockwise. When the slip ring 810 is in the disengaged position 900, a ratchet plate 904 is not engaged (is not active) with the outer bushing 906. When the slip ring 810 is in the engaged position 910, the ratchet plate 904 and bearing pressure plate 902 are forced to rotate with the outer bushing 906 until a limiting torque level is reached. Once the limiting torque level is reached, ratcheting begins whereby the ratchet plate 904 slips by the outer bushing 906. When the slip ring 810 is in the engaged position 910, and ratcheting occurs, the bearing pressure plate 902 and the ratchet plate 904 are rotatable without further rotation of the outer bushing 906.

Figure 11:
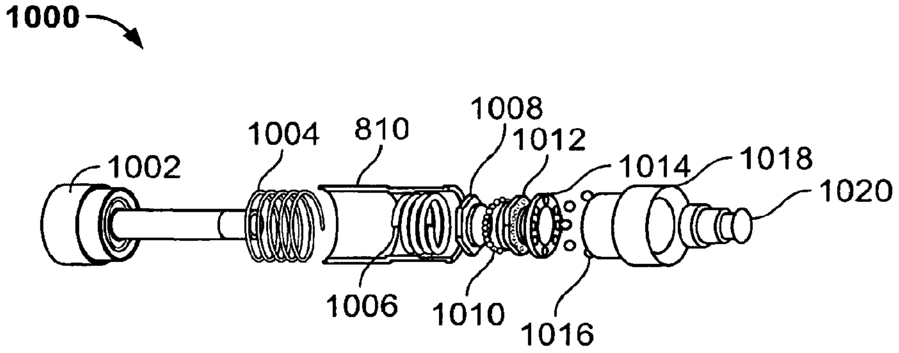
FIG. 11 is an exploded view of components of an electrical connector, including a slip ring formed in accordance with an embodiment of the present invention.

FIG. 11 illustrates an exploded view 1000 of the slip ring 810 with other components of the electrical connector formed in accordance with an embodiment of the present invention. A compression screw 1002 provides a central shaft for the components. The compression screw 1002 maintains the position of the components together when a nut 1020 is tightened to the end of the compression screw 1002. A low-pressure spring 1004 pushes the slip ring 810 against an outer bushing 1018 to maintain the slip ring 810 in the natural engaged position 910. As described herein, a user may pull the slip ring 810 backwards to change from the engaged position 910 to the disengaged position 900. Shown in order in FIG. 11 are a high-pressure spring 1006 pressing against a pressure plate 1008, which in combination with a ratchet plate 1012, encloses a bearing 1010. A retaining plate 1014 holds a bearing 1016 in place within an outer bushing 1018. The operation of these components is described herein.

While the invention has been described in terms of various specific embodiments, those skilled in the art will recognize that the invention can be practiced with modification within the spirit and scope of the claims.

What is claimed is:

1. A coupling mechanism, comprising:

a bushing assembly adapted to establish a coupling when rotated; a housing being rotatable by an application of torque thereto;

a torque-limit member having a positive-lock state positioned between said housing and said bushing assembly, said housing and bushing assembly rotating jointly upon the application of torque until a predefined torque level is attained;

a compressible member engaging said torque-limit member to define said predefined torque level, said torque-limit member switching from said positive-lock state to a ratchet state when said predefined torque level is attained such that said housing rotates relative to said bushing assembly; and a compression bushing provided between said compressible member and said torque-limit member and a bearing assembly engaging at least one of said torque limit member and said compressible member, said compression bushing being mounted to said housing and movable in an axial direction relative to said housing along a limited range of motion, said compression bushing preventing said compressible member from inducing pressure upon said bearing assembly in said axial direction.

2. The coupling mechanism of claim 1, wherein said housing further comprises a sleeve having an intermediate section rigidly receiving said torque-limit member and having a lead section receiving said bushing assembly.

3. The coupling mechanism of claim 1, further comprising a bearing assembly provided with said housing and engaging at least one of said torque-limit member and said compressible member.

4. The coupling mechanism of claim 1, further comprising a first bearing positioned, and permitting relative motion, between said compressible member and said torque-limit member.

5. The coupling mechanism of claim 1, wherein said bushing assembly includes a bushing having a mating face at one end and an interface wall at an opposite end, said torque-limit member engaging said interface wall in a non-slipping manner until said predefined torque level is attained.

6. The coupling mechanism of claim 1, wherein said torque-limit member includes a slip surface having one of a series of recesses and protrusions arranged in a pattern.

7. The coupling mechanism of claim 1, wherein said bushing assembly rotates about a coupling axis, said torque-limit member includes a sleeve rotatable about said coupling axis when said predefined torque level is attained.

8. The coupling mechanism of claim 1, wherein said compressible member is selected from the group comprising a compression spring, a urethane spring, a wave washer.

9. The coupling mechanism of claim 1, wherein said torque-limit member includes a ratchet plate having multiple dimples engaging and disengaging corresponding protrusions on said bushing assembly.

10. A coupling mechanism, comprising:

a bushing assembly adapted to establish a coupling when rotated;

a housing being rotatable by an application of torque thereto;

a torque-limit member having a positive-lock state positioned between said housing and said bushing assembly, said housing and bushing assembly rotating jointly upon the application of torque until a predefined torque level is attained;

a compressible member engaging said torque-limit member to define said predefined torque level, said torque-limit member switching from said positive-lock state to a ratchet state when said predefined torque level is attained such that said housing rotates relative to said bushing assembly; and a bearing assembly provided with said housing, wherein said housing further comprises a main shaft having a hollow core configured to receive electrical components, said bearing assembly being supported by and rotating about said main shaft.

11. A coupling mechanism, comprising:

a main shaft configured to receive electrical components;

a body rotatably mounted on said main shaft, said body adapted to establish a coupling when rotated;

a housing rotatably mounted to said main shaft;

a torque-limit member interconnecting said housing and said body when said torque-limit member is in a positive-lock state, said housing being locked to said body when said torque-limit member is in said positive-lock state until a predefined torque level is attained, said torque-limit member entering a ratchet state when said predefined torque level is attained to unlock said housing from said body, said housing rotating relative to said body when in said ratchet state;

and a bearings assembly provided on said main shaft and engaging said torque-limit member.

12. The coupling mechanism of claim 11, wherein said housing further comprises a sleeve having an intermediate section rigidly receiving said torque-limit member and having a lead section receiving said body.

13. The coupling mechanism of claim 11, further comprising a compressible member engaging said torque-limit member to define said predefined torque level at which said torque-limit member changes between said positive-lock state and said ratchet state.

14. The coupling mechanism of claim 11, wherein said bearing assembly includes a first bearing positioned, and supporting relative motion, between said body and said housing.

15. The coupling mechanism of claim 11, wherein said body includes a bushing having a mating face at one end and an interface wall at an opposite end, said torque-limit member engaging said interface wall in a non-slipping manner until said predefined torque level is attained.

16. The coupling mechanism of claim 11, wherein said torque-limit member includes a slip surface having one of a series of recesses and protrusions provided in said slip surface and arranged in a pattern.

17. The coupling mechanism of claim 11, wherein said body rotates about a coupling axis, said torque-limit member includes a sleeve rotating about said coupling axis when said predefined torque level is attained.

18. The coupling mechanism of claim 11, further comprising a compression bushing abutting against said torque-limit member, said compression bushing mounted to said main shaft and movable along a limited range of motion relative to said main shaft in an axial direction along said main shaft.

19. The coupling mechanism of claim 11, wherein said torque-limit member includes a ratchet plate having multiple dimples thereon, said dimples engaging and disengaging corresponding protrusions on said body.

* * * * *